L. F. DOUGLASS.
PROCESS OF PRODUCING COLORED CINEMATOGRAPHIC FILMS AND APPARATUS THEREFOR.
APPLICATION FILED AUG. 13, 1918.

1,325,280.

Patented Dec. 16, 1919.

Inventor
Leon F. Douglass

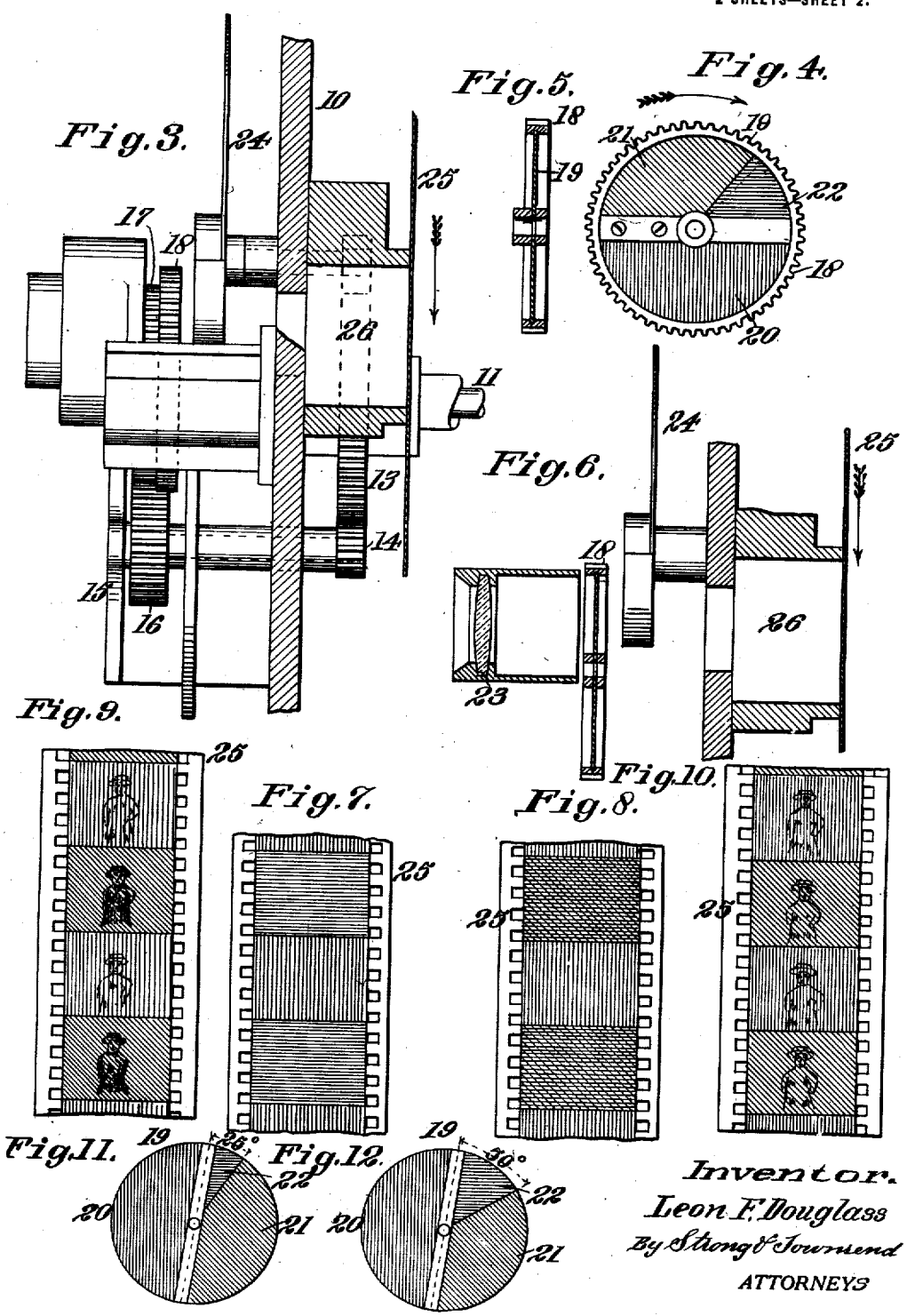

UNITED STATES PATENT OFFICE.

LEON FORREST DOUGLASS, OF SAN RAFAEL, CALIFORNIA.

PROCESS OF PRODUCING COLORED CINEMATOGRAPHIC FILMS AND APPARATUS THEREFOR.

1,325,280.  Specification of Letters Patent.  Patented Dec. 16, 1919.

Application filed August 13, 1918. Serial No. 249,649.

*To all whom it may concern:*

Be it known that I, LEON F. DOUGLASS, a citizen of the United States, residing at San Rafael, in the county of Marin and State of California, have invented new and useful Improvements in Processes of Producing Colored Cinematographic Films and Apparatus Therefor, of which the following is a specification.

This invention relates to a method of color photography and particularly pertains to the production of cinematographic films therefor.

Many attempts have been made to produce colored motion pictures, which would appear in a life-like manner without being accompanied with a flicker on the screen and without being presented in gaudy or unreal colors. Most of the processes carried out in producing such films have embodied the use of successively exposed negatives through alternately exposed filter screens, after which the positive films were prepared from the negative, and the successive scenes projected through alternate color screens.

Under various climatic conditions there is a difference in the sensitiveness of the negative to various colors, a predominance of a given color in a picture overcoming the other colors when the scene is photographed and thus throwing the photographic scene out of chromatic balance. This is especially noticeable when pictures are taken at close range.

Thus for example: If I take "Wraatten red filter A" and "Wraatten green filter B," which represent not only a standard of color but also a standard density and use them in my color filter wheel, as I do, one-half red and one-half green, exposing one after another on alternating pictures I will get as near a perfect natural color effect as is possible on "close-ups" of people, at a distance of not more than fifteen feet from the camera. But, if the person photographed had on a bright green dress of the same color value as the green filter "B" I would get a perfect face coloring, but the green (owing to its photographing much more rapidly than the red) would produce a very dark negative on that photograph through the green, while the red would be very light, this only in reference to the dress part of the negative and not the face (see Figure 9 for the general idea of what occurs). The reverse of this would result when the positive is made. When projected, the green would be so much stronger than the red that it would overpower it and cause a flicker. This would require very rapid speed to reproduce, because there has been recorded almost nothing of the green dress through the red filter.

To overcome this I sacrifice a little of the face coloring by bringing into use the blue color segment over the green filter, covering 25° of the circle (Fig. 11), thereby getting a more balanced picture, as shown in Fig. 10, in which it is observed that the green has been held back in exposure by the blue segment, thereby making it slower and more of an even density with the red. In the positive, which is the reverse of this, there is still perfect color separation which can be run at a slower speed because each picture shows instead of jumping from a green over to the next green picture without registering the red. When red colors dominate the scene it is of course necesssary to modify it by screens in the same manner described for the green. This is what I call a balanced picture and it is absolutely necessary to the making of successful pictures in natural colors.

Another very important point is in what is called "long-shots." The green always records much faster than the red. Therefore, while I could use equal amounts of the filters up to fifteen, anything over this distance and up to one hundred yards, or even a half mile, the exposure of the green must be much shorter than the red, because of the fact that the green records so much faster at long distance than it does in "close-ups." To overcome this, I cover more of the green filter (as shown in Fig. 12), which shows the green covers 50° of the circle.

To summarize: If the subject of the photograph has green as a predominant color and the picture is a "close-up" and is taken in the usual method, the green will be over exposed with respect to the other colors. If the picture is taken at a distance the green would show still greater exposure relative to the other colors. In either case the pictures are out of balance. From this it may be deduced that greens increase in actinic quality the more remote they are from the camera.

These various facts relating to light phenomena have, in the past, presented many difficulties in color photography which it is the object of the present invention to overcome.

In the present invention it is contemplated to use an ordinary motion picture camera, which is fitted with an auxiliary mechanism adapted to be readily applied to existing cameras, and which embodies a light filter construction; this filter being adjustable so that the possibility of unbalanced chromatic values in the negatives will be overcome and the negative made with its successive scenes in proper chromatic balance to insure that the reproduction of the picture upon the moving picture screen will display a faithful reproduction of the original subject-matter in color, thus eliminating the use of corrective printing means or other toning process.

The invention is illustrated by way of example in the accompanying drawings in which—

Fig. 3 is a view in vertical section and elevation through the camera, disclosing a general arrangement of the lens, shutter and film.

Fig. 4 is a view in elevation, illustrating color filter with which the camera is provided.

Fig. 5 is a view in transverse section through the filter.

Fig. 6 is a fragmentary view, disclosing the arrangement of the camera lens, filter, shutter and film.

Figs. 7 and 8 are fragmentary views in elevation, illustrating two forms of the film indicating the alternate colored portions thereon.

Fig. 9 illustrates a negative in which the successive images have not been balanced; the positive being the reverse so that in projecting the green will overcome the red and produce a flicker.

Fig. 10 shows the successive images balanced according to the present invention so that they can be run at a slower speed as both pictures show instead of jumping from one green picture to the next green picture.

Figs. 11 and 12 illustrate different positions of the color filters in balancing.

Figure 1:
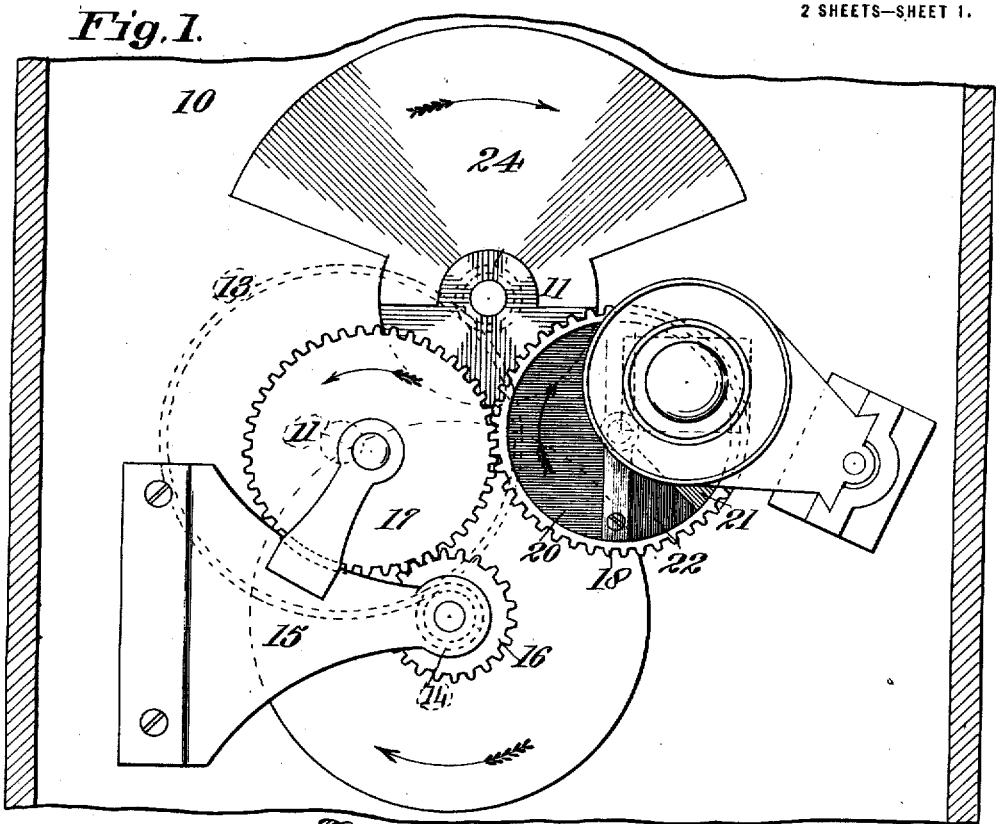
Fig. 1 is a fragmentary view in section and elevation, illustrating the shutter and filter mechanism of a camera constituting a part of the present apparatus.
Figure 2:
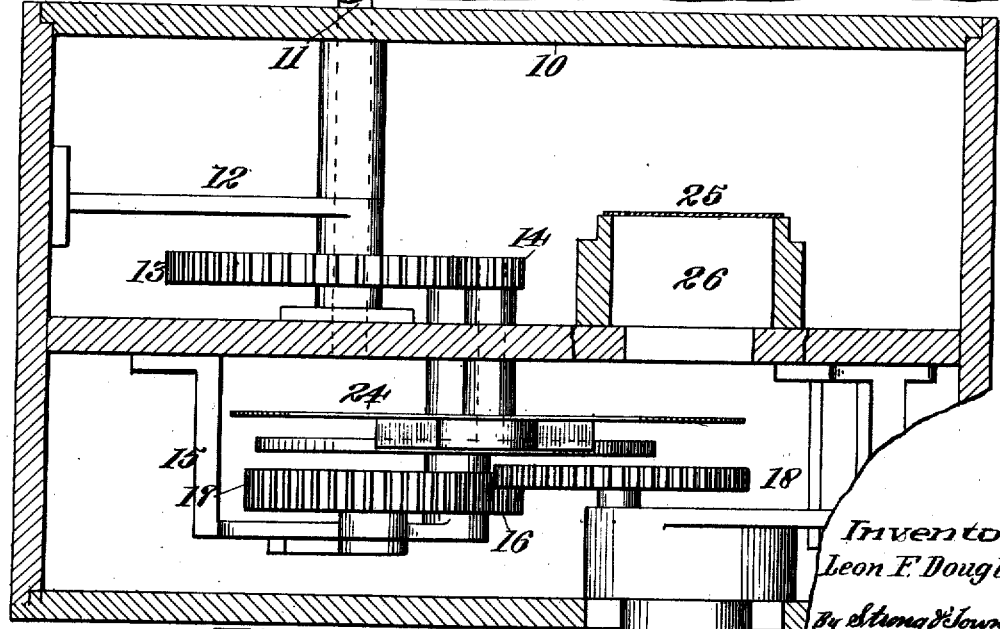
Fig. 2 is a view in horizontal section, disclosing the correlation of the camera lens to the shutter mechanism and the operating means therefor.

Referring more particularly to the drawings, 10 indicates a suitable camera case or housing, adapted to inclose a film feeding mechanism of common construction, and a shutter mechanism for intermittently admitting light to the film as fed. This shutter mechanism consists of an operating shaft 11 extending through the side of the case and adapted to be supported therein by a bracket bearing 12. Secured to the inner end of this shaft is a large driving gear 13 in mesh with a pinion 14. This pinion is mounted upon a shaft carried by a bracket 15, and upon the opposite end of which is mounted a larger pinion 16. The pinion 16, in the present instance, engages a gear 17, which is operatively associated with a ring gear 18. The ring gear 18 forms the annular frame of a color filter 19, particularly shown in Fig. 4.

This frame is provided with a central arm which extends from the frame hub to the rim and affords a mounting for the filter screens. In the present instance a red filter 20 is provided and substantially occupies one-half of the area of the screen. This filter is preferably of the type known as "Wraatten red filter A." The remaining half segment is covered by a green filter 21 occupying substantially three-quarters of the space and supplemental to a blue filter 22. This green filter is preferably similar to the "Wraatten green filter B." As particularly shown in Fig. 6, the filter 19 is interposed between a lens 23 and a shutter 24. This shutter is of common construction, and is rotated by the action of the shaft 11 through the movement of gear 13 in engagement with a shutter operating pinion 14. As particularly disclosed in Fig. 1 the obscuring segment upon the shutter does not represent 180° of the complete circle, and thus makes it certain that a maximum exposure of the film will be had through the color filters. Within the film compartment of the camera a film 25 is intermittently moved across an exposure opening 26 in proper alinement with the lens and the filter.

By this mechanism a motion picture may be taken at ordinary speeds, and the light impinging against the negative will be filtered by the screens 20, 21 and 22 in a manner to cause the subject matter of one negative to represent one of the primary colors, while the matter upon the other negative would represent the subject matter of another primary color.

The variation in initial influence of the colored light passing through the lens 23 to the film is effected by the relative areas of green and blue color filter through which the so-called green exposure is made. When the greens appear in much evidence in the picture the color filter is adjusted or interchanged to add a certain percentage of blue to the green. Under normal conditions the blue and green are proportioned in segments of 130° to 50 respectively. In cases when the green is strong, the proportion of blue is increased according to the judgment of the operator, thus holding back the green in the picture, and causing it to chromatically balance with the red.

While it is practical to correct the individual scenes of the positive during printing, this requires the exercise of considerable skill and judgment on the part of the printing operator and various conditions will cause differences throughout the length of the film. By the use of the present color film and its interchange or adjustment, the negative is properly produced at the time of exposure, thus providing a more efficient and mechanical method of taking the picture. This is especially so in view of the fact that the relative proportions of blue and green in the filter do not have to be varied except at the times of taking close-ups and distance pictures. When distance photographs are taken the green is more predominant, and, it is therefore necessary to increase the proportion of blue in the screen to hold back the green. When close-up pictures are taken, the effect of the green upon the negative is decreased, and it is merely necessary to interchange or adjust the filters, so that the blue will be decreased, and will permit the green to have more unrestricted influence upon the negative. It is absolutely essential that the exposures of the film stand in equal chromatic balance, and it will therefore be apparent that the device here disclosed provides for the production of a film to attain this result, and by a simple operation. It will be understood that after the pictures have been taken and printed upon a positive film the exposures thereon are successively and alternately colored as indicated in Fig. 8 to bring out the green and the red. This coloring may be produced by any desirable means, preferably by the application of masks to the portions of like chromatic value, during which time, the remaining portions are dyed a single color. When the film thus formed is complete, it may be projected by the ordinary motion picture projecting machine, and will reproduce the original scene without objectionable flicker. Experience has also proven that a film of the present type, in which the successive exposures are chromatically balanced, may be run at a much slower speed than colored motion pictures are usually operated at. In this manner the colors appearing upon the screen will be in more even density than formerly, and will appear in their proper balance.

While I have shown the preferred form of my invention as now known to me, it will be understood that various changes in the combination, construction and arrangement of parts may be made by those skilled in the art without departing from the spirit of the invention as claimed.

Having thus described my invention, what I claim and desire to secure by Letters Patent is—

1. The step in motion picture color photography of the character wherein successive sections of a photographically sensitive film are exposed one through a red screen and the other through a green screen, which consists in exposing each green picture for a small period of time through a blue screen and increasing the time of exposure through the blue screen at the expense of the green screen in proportion to the increase in distance from the lens to the object.

2. The step in motion picture color photography of the character wherein successive sections of a photographically sensitive film are exposed through a first color screen corresponding to greater wave lengths and a second complementary screen corresponding to lesser wave lengths, which consists in interrupting the exposure through said second screen and during such interruption permitting exposure through a third screen corresponding to wave lengths only slightly different from those of said second screen, and increasing the exposure through the third screen at the expense of the second screen as the distance from the lens to the object photographed increases.

In testimony whereof I have hereunto set my hand in the presence of two subscribing witnesses.

LEON FORREST DOUGLASS.

Witnesses:
THOMAS BOYD,
ESTHER C. HAMILTON.